US012170016B2

(12) United States Patent
Latham et al.

(10) Patent No.: US 12,170,016 B2
(45) Date of Patent: Dec. 17, 2024

(54) SYSTEMS AND METHODS FOR DETECTING SECURITY EVENTS IN AN ENVIRONMENT

(71) Applicant: Tyco Fire & Security GmbH, Neuhausen am Rheinfall (CH)

(72) Inventors: Nicholas James Frederick Latham, Neston (GB); Jason M. Ouellette, Sterling, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 271 days.

(21) Appl. No.: 17/672,182

(22) Filed: Feb. 15, 2022

(65) Prior Publication Data
US 2023/0260387 A1    Aug. 17, 2023

(51) Int. Cl.
G08B 23/00    (2006.01)
G05B 23/02    (2006.01)
G06N 20/00    (2019.01)

(52) U.S. Cl.
CPC ......... *G08B 23/00* (2013.01); *G05B 23/0221* (2013.01); *G05B 23/0224* (2013.01); *G06N 20/00* (2019.01)

(58) Field of Classification Search
CPC .................. G08B 23/00; G08B 29/185; G05B 23/0221; G05B 23/0224; G06N 20/00
See application file for complete search history.

(56) References Cited

U.S. PATENT DOCUMENTS

| 2015/0097685 | A1  | 4/2015  | Sloo et al.      |            |
|--------------|-----|---------|------------------|------------|
| 2018/0302423 | A1* | 10/2018 | Muddu ............... | G06F 3/04842 |
| 2018/0336353 | A1  | 11/2018 | Manadhata et al. |            |
| 2022/0076555 | A1* | 3/2022  | Menard ............... | G08B 25/006 |

FOREIGN PATENT DOCUMENTS

WO    2020205597 A1    10/2020

OTHER PUBLICATIONS

International Search Report and Written Opinion issued in corresponding International Application No. PCT/US2023/06170 dated May 30, 2023.

* cited by examiner

*Primary Examiner* — Quan Zhen Wang
*Assistant Examiner* — Rajsheed O Black-Childress
(74) *Attorney, Agent, or Firm* — ArentFox Schiff, LLP (57) ABSTRACT

Example implementations include aspects for controlling a security system monitoring an environment, comprising collecting sensor data from a plurality of sensors located in the environment, and determining whether a plurality of characteristics of a security event are present in the environment. A determination for each characteristic includes a confidence score indicative of a likelihood that the characteristic is present. The aspects further include identifying, from a plurality of pre-determined environment states, a state of the environment based on a current time and an event schedule of the environment, and generating a combined score that is a function of each respective confidence score and a plurality of weights, wherein each weight corresponds to a respective characteristic and has a value based on the state of the environment. The implementations further include determining that the combined score is greater than a threshold score, and generating an alert indicative of the security event.

17 Claims, 6 Drawing Sheets

SYSTEMS AND METHODS FOR DETECTING SECURITY EVENTS IN AN ENVIRONMENT

TECHNICAL FIELD

The described aspects relate to security systems.

BACKGROUND

Aspects of the present disclosure relate generally to security systems, and more particularly, to detecting security events in an environment.

A security event represents a potential hazard in an environment that needs to be resolved. For example, if the environment is a train station, the security event may be a track fire. Security events may range from low risk events (e.g., a person standing too close to a train track) to high risk events (e.g., a person jumping on the train track while a train is approaching). Although security officers such as law enforcement or security guard monitor for such security events, manual monitoring is limited and, at times, unreliable.

To aid officers, security systems are typically installed in environments. However, conventional security systems tend to be one-dimensional as they only monitor for a single data type (e.g., whether an alarm has been rung, whether water is detected on the tracks, whether a noise exceeds a threshold decibel level, etc.). Accordingly, conventional security systems are unable to monitor for a variety of security events and may generate several false positives. For example, if a security system detects a scream and generates a security event, it is possible that the scream is not associated with a dangerous incident and instead originates from a child playing around; this renders the generated security event as a false positive.

Accordingly, there exists a need for improvements in such security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for controlling a security system monitoring an environment, comprising collecting sensor data from a plurality of sensors located in the environment. The method further includes determining, based on the sensor data, whether a plurality of characteristics of a security event are present in the environment, wherein a determination for each respective characteristic further includes a respective confidence score indicative of a likelihood that the respective characteristic is present. Additionally, the method further includes identifying, from a plurality of pre-determined environment states, a state of the environment based on a current time and an event schedule of the environment. Additionally, the method further includes generating a combined score that is a function of each respective confidence score and a plurality of weights, wherein each weight of the plurality of weights corresponds to a respective characteristic of the plurality of characteristics and has a value based on the state of the environment. Additionally, the method further includes determining that the combined score is greater than a threshold score. Additionally, the method further includes generating an alert indicative of the security event in response to determining that the combined score is greater than the threshold score.

Another example implementation includes an apparatus for controlling a security system monitoring an environment, comprising a memory and a processor communicatively coupled with the memory. The processor is configured to collect sensor data from a plurality of sensors located in the environment. The processor is further configured to determine, based on the sensor data, whether a plurality of characteristics of a security event are present in the environment, wherein a determination for each respective characteristic further includes a respective confidence score indicative of a likelihood that the respective characteristic is present. Additionally, the processor further configured to identify, from a plurality of pre-determined environment states, a state of the environment based on a current time and an event schedule of the environment. Additionally, the processor further configured to generate a combined score that is a function of each respective confidence score and a plurality of weights, wherein each weight of the plurality of weights corresponds to a respective characteristic of the plurality of characteristics and has a value based on the state of the environment. Additionally, the processor further configured to determine that the combined score is greater than a threshold score. Additionally, the processor further configured to generate an alert indicative of the security event in response to determining that the combined score is greater than the threshold score.

Another example implementation includes an apparatus for controlling a security system monitoring an environment, comprising means for collecting sensor data from a plurality of sensors located in the environment. The apparatus further includes means for determining, based on the sensor data, whether a plurality of characteristics of a security event are present in the environment, wherein a determination for each respective characteristic further includes a respective confidence score indicative of a likelihood that the respective characteristic is present. Additionally, the apparatus further includes means for identifying, from a plurality of pre-determined environment states, a state of the environment based on a current time and an event schedule of the environment. Additionally, the apparatus further includes means for generating a combined score that is a function of each respective confidence score and a plurality of weights, wherein each weight of the plurality of weights corresponds to a respective characteristic of the plurality of characteristics and has a value based on the state of the environment. Additionally, the apparatus further includes means for determining that the combined score is greater than a threshold score. Additionally, the apparatus further includes means for generating an alert indicative of the security event in response to determining that the combined score is greater than the threshold score.

Another example implementation includes a computer-readable medium storing instructions for controlling a security system monitoring an environment, wherein the instructions are executable by a processor to collect sensor data from a plurality of sensors located in the environment. The instructions are further executable to determine, based on the sensor data, whether a plurality of characteristics of a security event are present in the environment, wherein a determination for each respective characteristic further includes a respective confidence score indicative of a likelihood that the respective characteristic is present. Additionally, the instructions are further executable to identify, from a plurality of pre-determined environment states, a state of the environment based on a current time and an event schedule of the environment. Additionally, the instructions are further executable to generate a combined score that is a function of each respective confidence score and a plurality of weights, wherein each weight of the plurality of weights corresponds to a respective characteristic of the plurality of characteristics and has a value based on the state of the environment. Additionally, the instructions are further executable to determine that the combined score is greater than a threshold score. Additionally, the instructions are further executable to generate an alert indicative of the security event in response to determining that the combined score is greater than the threshold score.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods for detecting security events using a plurality of sensors in an environment. The apparatuses and methods may be implemented in a security system and may be used to execute a dynamic scoring matrix that receives confidence scores and applies programmable weights to determine whether readings from the plurality of sensors warrant generating a security event. Depending on the time of day and situation, the weights of the dynamic scoring matrix are adjusted.

In some aspects, the plurality of sensors provide sensor data including, but not limited to: audio data (e.g., keyword detection, announcement data, etc.), thermal data (e.g., body heat detection), computer vision data (e.g., object classification, object tracking, lighting data, etc.), behavioral data (e.g., mood determination, age approximation, alcohol level determination, etc.), historical patterns (e.g., data from past confirmed security events), weather data, social media data (e.g., keywords, images, etc.), etc.

Based on the severity of the security event (as indicated in the output of the dynamic scoring matrix), the security system executes an appropriate response. For example, if a fire is detected, the security system may activate a fire alarm and inform firefighters. If a person jumps on train tracks, the security system may activate the brakes of an incoming train and contact law enforcement. The benefits of this security system may include one or more of faster response times in recognizing security events, targeted proactive responses that are automated, reduced false positives, and adjustable sensitivity based on environmental factors (e.g., time, situation, etc.).

Figure 1:
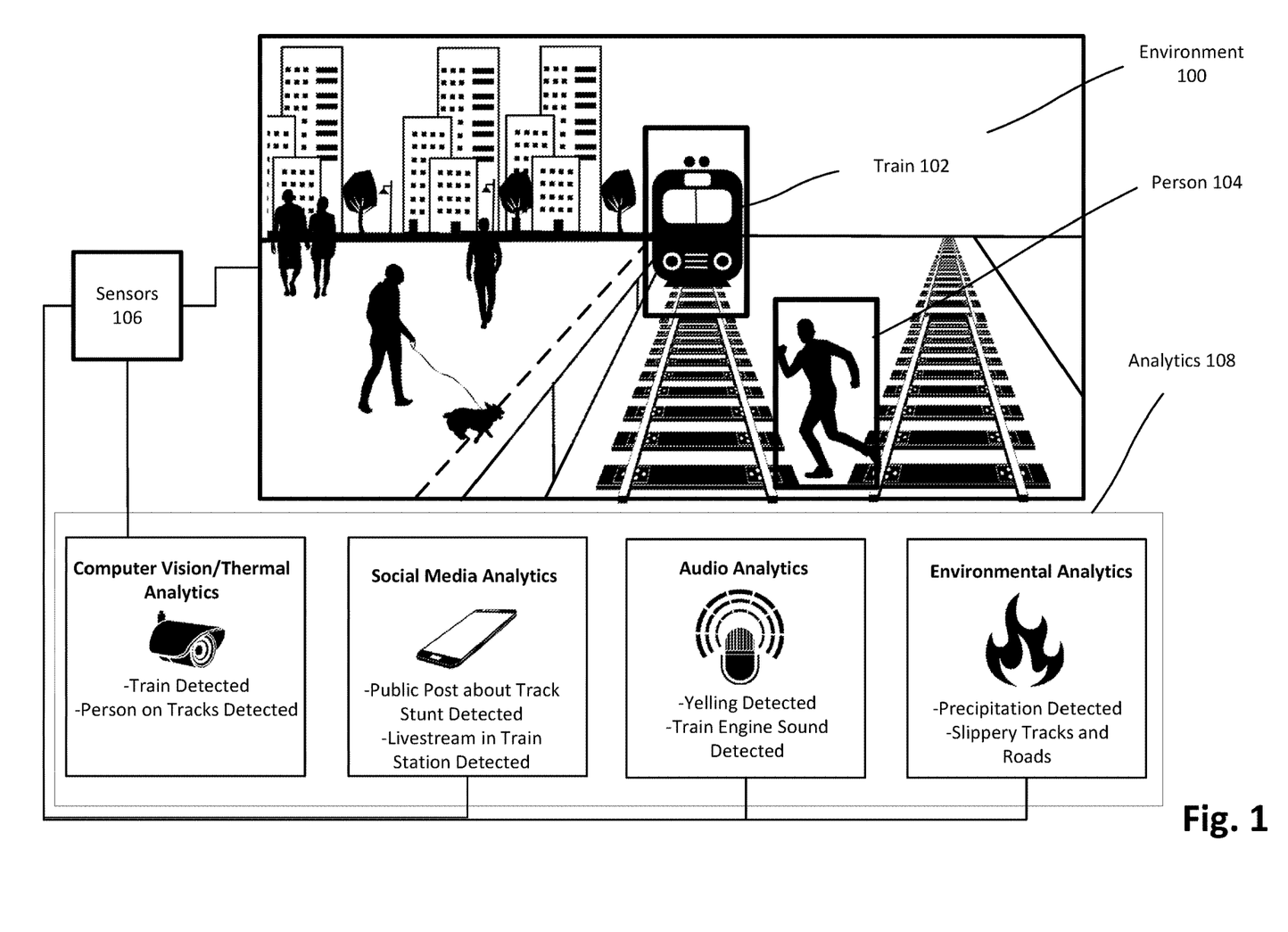
FIG. 1 is a diagram of an environment in which a security event is detected, in accordance with exemplary aspects of the present disclosure.

FIG. 1 is a diagram of environment 100 in which a security event is detected, in accordance with exemplary aspects of the present disclosure. It should be noted that although environment 100 is shown to be a train station, the systems and methods of the present disclosure are applicable to any environment where a plurality of sensors are installed. Other example environments may include, but are not limited to, an airport, a school, a hospital, an office, a prison, etc. In the context of a train station, types of incidents may include, but are not limited to, trespassing, theft, drug abuse, filming dangerous stunts in unauthorized locations, vandalism, suicide attempts, etc.

For example, in FIG. 1, an event detection component may use computer vision to identify train 102 approaching the station, person 104 on the tracks, and multiple other persons walking in the station. The computer vision may be applied to frames taken from one or more sensors 106, such as a thermal camera or a video camera.

Computer vision and thermal analytics represent one stream of information gathered to detect events. For example, there may be a plurality of sensors 106 distributed throughout environment 100. In some implementations, for instance, a portion of the sensor data evaluated by the event detection component may originate from microphones. Thus, in such instances, the event detection component may apply audio analytics to detect yelling and the sound of the train engine from train 102.

The sensor data may also include information about environment 100. For example, the plurality of sensors may include water/moisture detection sensors, smoke detectors, carbon monoxide detectors, etc. Using the sensor data from these sensors, an event detection component may detect precipitation in environment 100 and may determine that the tracks and the floor of the station are slippery. This makes the presence of person 104 on the tracks even more dangerous because the braking system of the train 102 may be less effective and because person 104 has a higher chance of slipping.

The sensor data may also include social media data. For example, the event detection component may monitor for public social media posts on social media platforms such as Facebook, Instagram, Twitter, etc. In some aspects, the event detection component may filter the public posts based on the location associated with the post (i.e., the location indicated in the metadata of a post/photo). Using computer vision and natural language processing, the event detection component may determine that a public post about a track stunt is detected and a live stream on the train station is detected.

Accordingly, in some aspects, the present disclosure includes the use of fused sensor data such as, but not limited to, the use of audio (keywords), thermal data (human body heat detection), computer vision data (object classification, direction/tracking), alcohol level data, behavioral analytic data (mood, age, drunk, fight, etc.), historical pattern detection data (past offenses), weather feed data, social media feed data (keyword, images) to generate, for example, analytics 108. Further, in such aspects, the present disclosure includes a system having a scoring algorithm of probability allowing a user defined threshold score to drive an autonomous triggered response which can include, but is not limited to, lighting controls, audio announcements, and first responder dispatch through an integrated security system. Thus, the present disclosure may provide improved reliability and safety/security of areas, such as but not limited to areas where people could trespass, where there is opportunity for injury, death, or vandalism and/or where liability runs high risk such as train stations, power plants, quarries, ports, airports, dams, etc.

Figure 2:
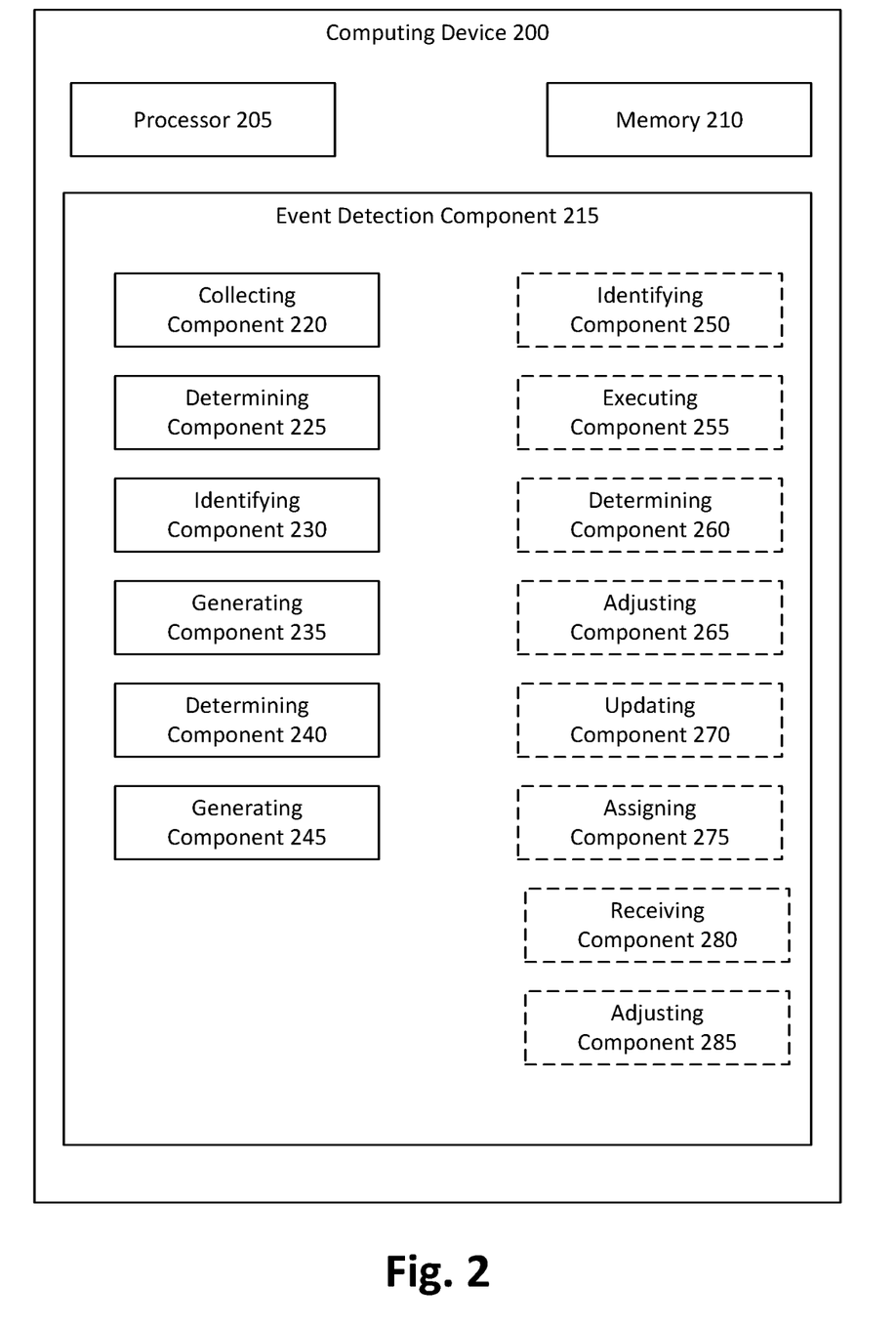
FIG. 2 is a block diagram of a computing device executing an event detection component, in accordance with exemplary aspects of the present disclosure.
Figure 3:
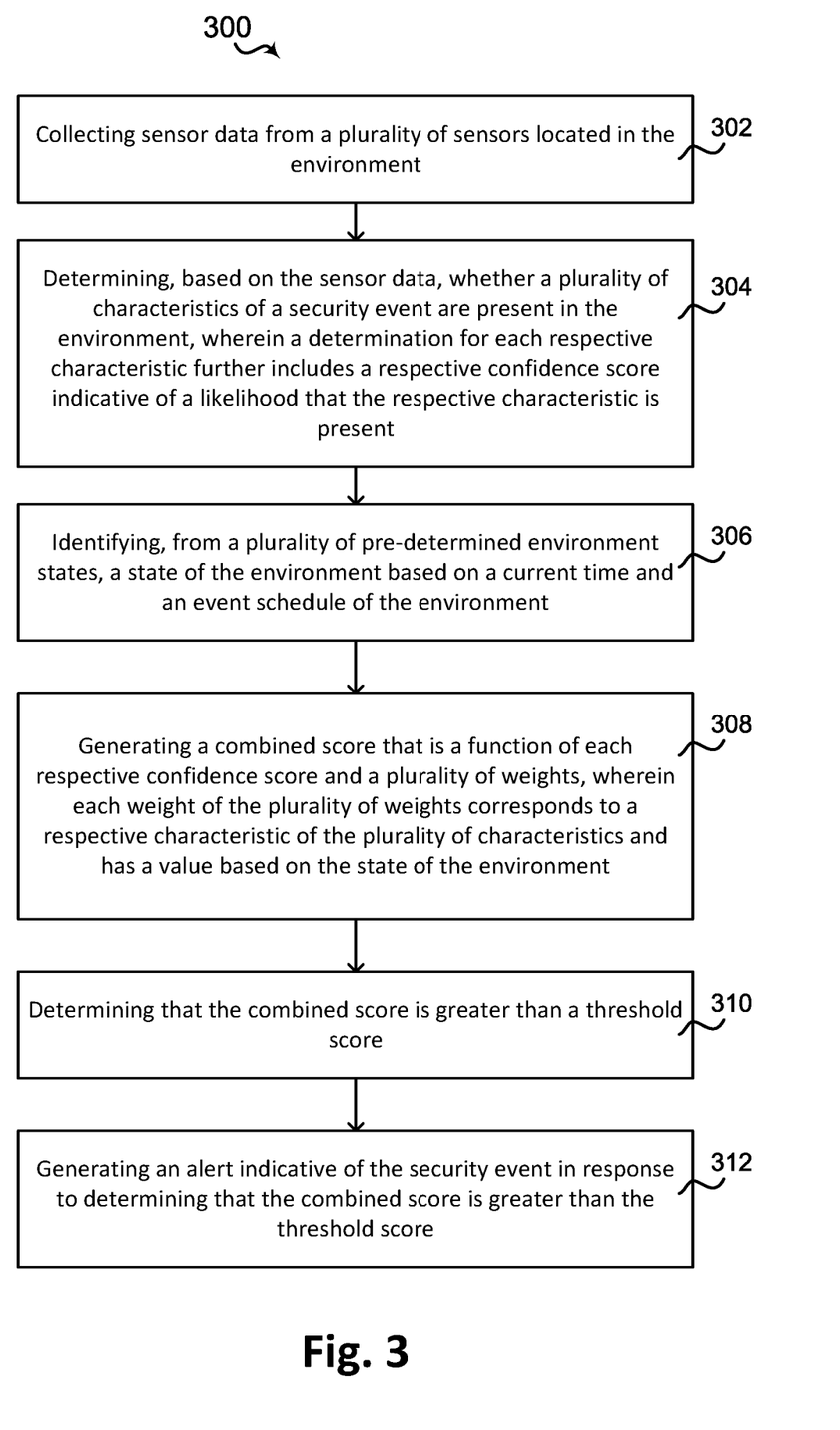
FIG. 3 is a flowchart illustrating a method of detecting a security event in an environment, in accordance with exemplary aspects of the present disclosure.

Referring to FIG. 2 and FIG. 3, in operation, computing device 200 may perform a method 300 for controlling a security system monitoring an environment 100 (see FIG. 1), such as via execution of event detection component 215 by processor 205 and/or memory 210.

At block 302, the method 300 includes collecting sensor data from a plurality of sensors located in the environment. For example, in an aspect, computing device 200, processor 205, memory 210, event detection component 215, and/or collecting component 220 may be configured to or may comprise means for collecting sensor data from a plurality of sensors located in environment 100. Examples of sensors in the plurality of sensors include, but are not limited to, video/imaging cameras, thermal cameras, microphones, smart speakers, computers, moisture sensors, smoke detectors, light detection sensors, depth sensors, etc.

At block 304, the method 300 includes determining, based on the sensor data, whether a plurality of characteristics of a security event are present in the environment, wherein a determination for each respective characteristic further includes a respective confidence score indicative of a likelihood that the respective characteristic is present. For example, in an aspect, computing device 200, processor 205, memory 210, event detection component 215, and/or determining component 225 may be configured to or may comprise means for determining, based on the sensor data, whether a plurality of characteristics of a security event are present in environment 100, wherein a determination for each respective characteristic further includes a respective confidence score indicative of a likelihood that the respective characteristic is present.

A security event may involve, but is not limited to, a hazardous situation such as a person getting too close to a restricted area (e.g., a platform edge) or a person trespassing (e.g., entering train tracks), a medical situation such as a person passing out or a person getting injured, an environmental situation such as a storm or a fire, etc. Event detection component 215 may monitor for a plurality of security events at any given time.

Each security event is associated with a plurality of characteristics. For example, a security event involving trespassing may be associated with characteristics such as visual/thermal detection of a person in a restricted area, detection of a social media post indicating an intention to trespass, audio detection of a person in the restricted area, etc. In contrast, a security event involving a fire may be associated with characteristics such as visual detection of flames, audio detection of yelling, detection of carbon monoxide, etc. In yet another example, a security event involving a suicide attempt may be associated with characteristics such as a person loitering on the platform edge for a threshold period of time, the person jumping onto the tracks while a train is approaching, social media posts by the person indicative of depression, etc.

Event detection component 215 may use a plurality of detection algorithms to determine whether the characteristics of a given security event are present in environment 100. For example, event detection component 215 may evaluate whether a trespassing is occurring in environment 100.

A first characteristic of this security event involves visual detection of a person in a restricted area. Suppose that the scene depicted in FIG. 1 is an image frame captured by a camera. Using computer vision (e.g., object detection), event detection component 215 may detect person 104 in a portion of a frame that corresponds to a restricted section (restricted zones/sections may be pre-identified in each image manually or using machine learning classification). Event detection component 215 may further provide a confidence score indicative of a likelihood that the detection of person 104 is correct. For example, based on the quality of the image, the object detection model may not be 100% sure that person 104 is in fact a person and not just an object that resembles some human characteristics.

The confidence score may change based on how often the person appears in frames. For example, if the person is loitering on the tracks and is spotted in at least a threshold number of frames, the confidence score may increase.

It should be noted that in low light conditions, the confidence score of the first characteristic may be lower than in regular conditions. The quality of footage produced by security cameras may be limited because of lighting/weather conditions. This is one example of why one-dimensional detection methods are ineffective. Conventional security systems using solely cameras footage may mistake a random object for a person and produce unnecessary alerts/alarms. To overcome this deficiency, a combination of characteristics are considered.

A second characteristic of a trespassing security event may involve thermal detection of a person in a restricted area. For example, if thermal camera data is available, the heat radiating off of person 104 may be captured in the data. Using computer vision techniques, event detection component 215 may determine that an image frame depicting the thermal camera data includes person 104 in a portion of the image associated with a restricted section of environment 100. Event detection component 215 may further provide a confidence score indicative of a likelihood that the detection of person 104 is correct.

A third characteristic of a trespassing security event may involve detecting a human voice in a restricted zone of environment 100. For example, a standalone microphone or a camera microphone may capture audio originating from the train tracks in environment 100. By applying voice recognition techniques, event detection component 215 may determine that a person is talking in the restricted section of environment 100. Event detection component 215 may further provide a confidence score indicative of a likelihood that the human voice classification in the audio data is correct. In some aspects, additional characteristics may involve detection of a keyword in the audio data. For example, if the word "help" is identified in the audio data, the chances that a security event is occurring increases. Accordingly, detection of these keywords may be associated with a greater weight.

A fourth characteristic of a trespassing security event may involve detecting a social media post that lists environment 100 as the location and includes an indication of a trespassing. For example, event detection component 215 may retrieve a plurality of posts from various social media platforms that are posted within a threshold period of time (e.g., previous 15 minutes). The posts may include text, photos, videos, live video streams, etc. Event detection component 215 may then filter posts that specifically mention environment 100. Event detection component 215 may then analyze each post, using natural language processing, to determine whether the post mentions a trespassing in a restriction section. For example, event detection component 215 may identify a public post about a person planning to perform a stunt on the train tracks of environment 100. Event detection component 215 may further provide a confidence score indicative of a likelihood that the post is associated with the security event (e.g., trespassing in environment 100). In particular, event detection component 215 may search for a plurality of keywords ("stunt," "jump onto tracks," "trespass," "run on tracks," etc.) associated with the security event and determine how many are present in post.

A fifth characteristic of a trespassing security event may involve detection of a historic occurrence of the security event. For example, person 104 may be a stuntman that has repeatedly trespassed in environment 100 in the past. If person 104 is identified in environment 100 yet again, there is a chance that person 104 intends to trespass. Historic occurrences thus take security events of the same type (e.g., fires, trespassing, etc.) and identify aspects of those occurrences that are present in the current sensor data. Event detection component 215 may further provide a confidence score indicative of a likelihood that the historic occurrence is present in the sensor data.

Consider the following table (table 1) in which the characteristics of a trespassing security event are presented along with exemplary confidence scores:

TABLE 1

| Sensor | Algorithm | Characteristic | Confidence Score |
| --- | --- | --- | --- |
| Imaging Camera | Computer Vision | Visual of Person in Restricted Section | 85% |
| Thermal Camera | Computer Vision | Thermal Signature of Person in Restricted Section | 80% |
| Microphone | Voice Recognition | Human Voice in Restricted Section | 60% |
| Social Media Server | Natural Language Processing | Post associated with Trespassing | 10% |
| Combination | Combination | Historic Occurrence | 10% |

Table 1 indicates that event detection component 215 is 85% sure based on visual data that a person is in the restricted section of environment 100, is 80% sure based on thermal data that a person is in the restricted section of environment 100, is 60% sure that the audio data includes a human voice, is 10% sure that a retrieved social media post is indicative of the intention to trespass, and is 10% sure that a historic occurrence is occurring again (e.g., presence of a person who has triggered the security event in the past).

It should be noted that these characteristics are merely a few examples of possible characteristics that event detection component 215 can monitor for. For example, another characteristic may include a determination of whether the weather is poor (e.g., is it raining and what is the confidence).

At block 306, the method 300 includes identifying, from a plurality of pre-determined environment states, a state of the environment based on a current time and an event schedule of the environment. For example, in an aspect, computing device 200, processor 205, memory 210, event detection component 215, and/or identifying component 230 may be configured to or may comprise means for identifying, from a plurality of pre-determined environment states, a state of environment 100 based on a current time and an event schedule of the environment 100.

Every environment may have its own unique set of states. A user of event detection component 215 may add or remove states from a plurality of pre-determined environment states, which may be stored in memory 210 as a data structure. For example, the plurality of pre-determined environment states may include the following states for environment 100: train arriving, train departing, evening rush hour, school dismissal, morning rush hour, night shift, rainy period, snow period, etc. Each state may be associated with a time period that is managed in an event schedule. For example, the state of "morning rush hour" may be from 6:00 am to 8:30 am. During this time, there may be a greater number of people than usual in the environment. The state of "night shift" may be from 8:00 pm to 5:00 am. During this time, low light conditions may be present in environment 100.

At block 308, the method 300 includes generating a combined score that is a function of each respective confidence score and a plurality of weights, wherein each weight of the plurality of weights corresponds to a respective characteristic of the plurality of characteristics and has a value based on the state of the environment. For example, in an aspect, computing device 200, processor 205, memory 210, event detection component 215, and/or generating component 235 may be configured to or may comprise means for generating a combined score that is a function of each respective confidence score and a plurality of weights, wherein each weight of the plurality of weights corresponds to a respective characteristic of the plurality of characteristics and has a value based on the state of the environment.

Consider the following table (table 2), which shows respective weights for each characteristic and an adjusted score for each confidence score. Here, each adjusted score is determined by multiplying the confidence score with the respective weight. However, in some aspects, the adjusted score can be determined by adding the weight, dividing the weight, subtracting the weight, or applying any mathematical combination of transformations to the confidence score using the weight.

TABLE 2

| Characteristic | Confidence Score | Weight | Adjusted Score |
| --- | --- | --- | --- |
| Visual of Person in Restricted Section | 85% | 1.5 | 127.5 |
| Thermal Signature of Person in Restricted Section | 80% | 1.4 | 112 |

TABLE 2-continued

| Characteristic | Confidence Score | Weight | Adjusted Score |
| --- | --- | --- | --- |
| Human Voice in Restricted Section | 60% | 1.1 | 66 |
| Post associated with Trespassing | 10% | 1.2 | 12 |
| Historic Occurrence | 10% | 1.25 | 12.5 |

The weights shown in the table may be associated with a state in which a train is arriving at environment 100. For example, the train may be scheduled to arrive at 3:00 pm and because the sensor data is captured within a threshold period of time from this arrival time (e.g., 1 minute prior to 3:00 pm), the weights shown above are used.

The combined scored may be achieved by applying any mathematical combination of transformations to the adjusted scores. For example, event detection component 215 may add all of the adjusted scores to arrive at a combined score of 330.

In an optional or additional aspect, a respective weight of the plurality of weights has a first value for the state of the environment and a second value for another state of the environment. Different states are associated with their own set of weights to improve the detection of security events. For example, if the state of environment 100 is "night shift" or "rainy weather," the weights may be different to account for lower camera quality. In these states, the respective weights and adjusted scores may be as follows:

TABLE 3

| Characteristic | Confidence Score | Weight | Adjusted Score |
| --- | --- | --- | --- |
| Visual of Person in Restricted Section | 55% | 1.2 | 66 |
| Thermal Signature of Person in Restricted Section | 85% | 1.6 | 136 |
| Human Voice in Restricted Section | 50% | 1.2 | 60 |
| Post associated with Trespassing | 20% | 1.3 | 26 |
| Historic Occurrence | 10% | 1.3 | 13 |

Table 3 depicts larger weights in the thermal, audio, social media, and historic occurrence-based characteristics and a lower weight in the visual-based characteristic. The confidence scores have been adjusted as well. For example, in low light conditions, the confidence score of detecting person 104 using an image may decrease to 55%. The combined score in this case is 301.

At block 310, the method 300 includes determining that the combined score is greater than a threshold score. For example, in an aspect, computing device 200, processor 205, memory 210, event detection component 215, and/or determining component 240 may be configured to or may comprise means for determining that the combined score is greater than a threshold score.

For each security event, there may be a threshold score that indicates whether the security event is occurring in environment 100. For example, event detection component 215 may refer to a database in memory 215 that indicates a plurality of security events, their characteristics, the respective weight for each characteristic in each environment state, and a threshold score for the security event. Suppose that the threshold score for a trespassing security event is 300. Both of the two combined scores described previously (330 and 301) are greater than this threshold score.

At block 312, the method 300 includes generating an alert indicative of the security event in response to determining that the combined score is greater than the threshold score. For example, in an aspect, computing device 200, processor 205, memory 210, event detection component 215, and/or generating component 245 may be configured to or may comprise means for generating an alert indicative of the security event in response to determining that the combined score is greater than the threshold score.

For example, event detection component 215 may determine that the trespassing security event is occurring because the combined score is greater than the threshold score. The alert generated may be a visual or audio-based alert shown on a graphical user interface of event detection component 215. For example, a security officer may monitor environment 100 using event detection component 215. When a security event is detected, the alert may be presented to the security officer. In some aspects, the alert may be generated as a text message, an email, a notification, etc., and transmitted to a pre-identified individual (e.g., the phone of a security officer).

It should be noted that if the weights were not adjusted during the "night shift" state and were kept as the original weights of the "train arriving" state, the combined score would be 293 (confidence scores from table 3 and weights from table 2). This would be lower than the threshold score. Accordingly, no alert would be generated and this would be an example of a false negative (i.e., person 104 is on the tracks, but not alert was generated). Thus, the adjustment of the weights based on the state of the environment improves detection of security events.

In some aspects, the alert may be a command to a device located in the environment. For example, the alert may instruct a light in the environment to begin flashing. The alert may instruct an audio device in the environment to emit a sound (e.g., a siren).

Figure 4:
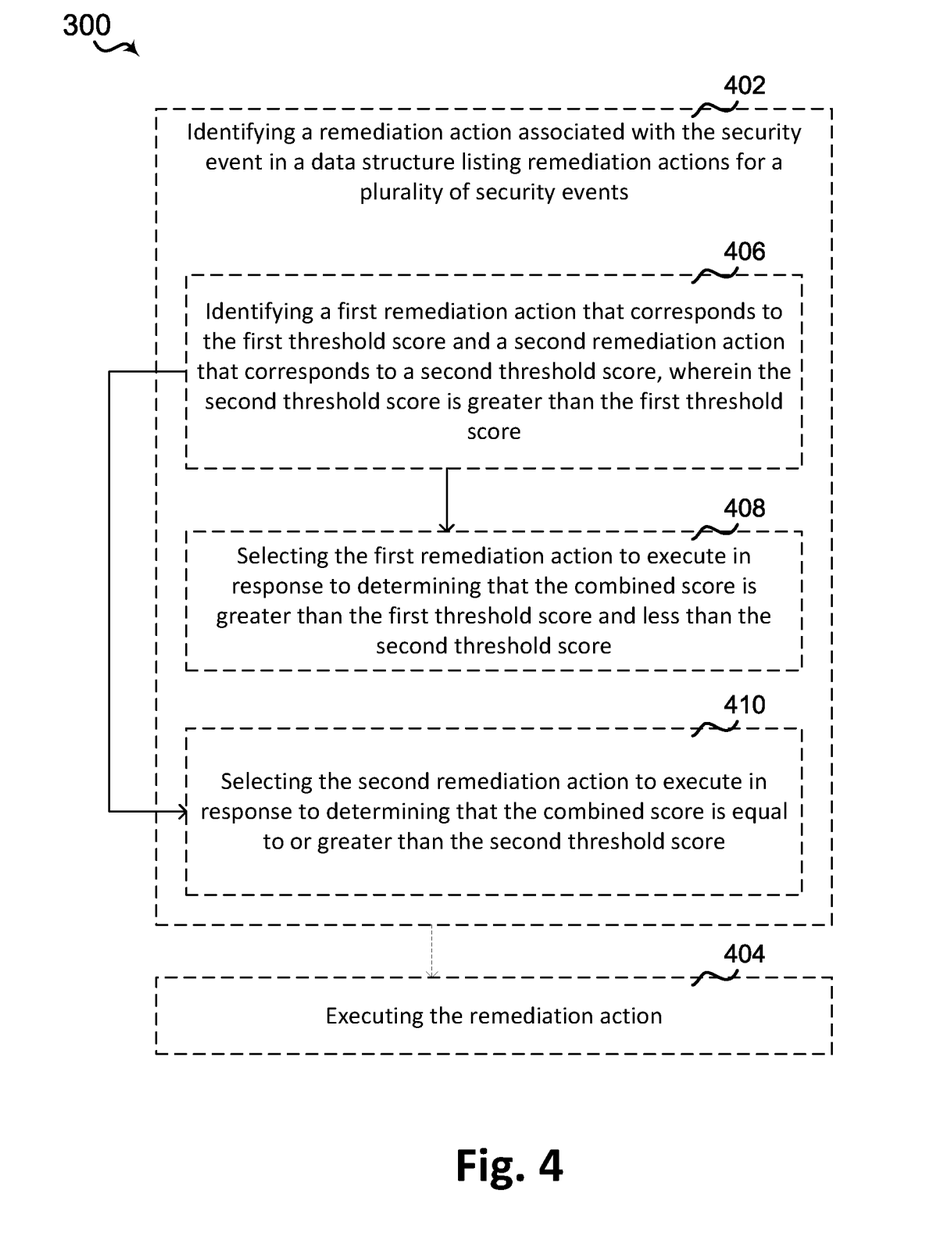
FIG. 4 is a flowchart illustrating a method of identifying a remediation action, in accordance with exemplary aspects of the present disclosure.

FIG. 4 is a flowchart illustrating a method of identifying a remediation action, in accordance with exemplary aspects of the present disclosure.

Referring to FIG. 4, in an optional or additional aspect, at block 402, the method 300 may further include identifying a remediation action associated with the security event in a data structure listing remediation actions for a plurality of security events. For example, in an aspect, computing device 200, processor 205, memory 210, event detection component 215, and/or identifying component 250 may be configured to or may comprise means for identifying a remediation action associated with the security event in a data structure listing remediation actions for a plurality of security events.

For example, the remediation actions for a trespassing security event may be different depending on the state of the environment. If the trespassing security event is specific to train tracks and the state of the environment is "train arrival," a remediation action may involve applying the brakes on the train. Other examples of remediation actions include, but are not limited to, calling law enforcement, ringing an alarm, notifying a security guard, closing track gates, etc. As mentioned before, the remediation actions are specific to a security event. For example, if the security event involved a fire, remediation actions may include calling firefighters, activating sprinklers, ringing a fire alarm, notifying a security guard, generating an automated announcement to evacuate environment 100, etc.

In this optional aspect, at block 406, the identifying at block 402 of the remediation action comprises identifying a first remediation action that corresponds to the first threshold score and a second remediation action that corresponds to a second threshold score, wherein the second threshold score is greater than the first threshold score Each remediation action may be associated with a specific threshold score. Consider the following table, which lists threshold scores for a few remediation actions associated with a trespassing security event.

TABLE 4

| Remediation Action | Threshold Score | Additional Criteria |
|---|---|---|
| Notify security guard to inspect | 300 | |
| Ring alarm | 315 | |
| Apply train brakes | 330 | State: arriving/departing train |
| Call law enforcement | 340 | |

In this optional aspect, at block 408, the identifying at block 402 of the remediation action comprises selecting the first remediation action to execute in response to determining that the combined score is greater than the first threshold score and less than the second threshold score.

Suppose that the first threshold score is 300 and the second threshold score is 315. If the combined score is 301, the first threshold score is exceeded and the second threshold score is not. Accordingly, the remediation action of notifying a security guard to inspect is selected.

In this optional aspect, at block 410, the identifying at block 402 of the remediation action comprises selecting the second remediation action to execute in response to determining that the combined score is equal to or greater than the second threshold score. Here, if the combined score is 330, the second threshold score is exceeded. Accordingly, the remediation action of ringing an alarm is selected. The second remediation action takes a more drastic step in attempting to resolve the security event because there is greater confidence that the security event is happening.

In this optional aspect, at block 404, the method 300 may further include executing the remediation action. For example, in an aspect, computing device 200, processor 205, memory 210, event detection component 215, and/or executing component 255 may be configured to or may comprise means for executing the remediation action.

For example, event detection component 215 may execute the identified remediation action from block 402 (e.g., notify a security guard by transmitting an alert to their smartphone).

Figure 5:
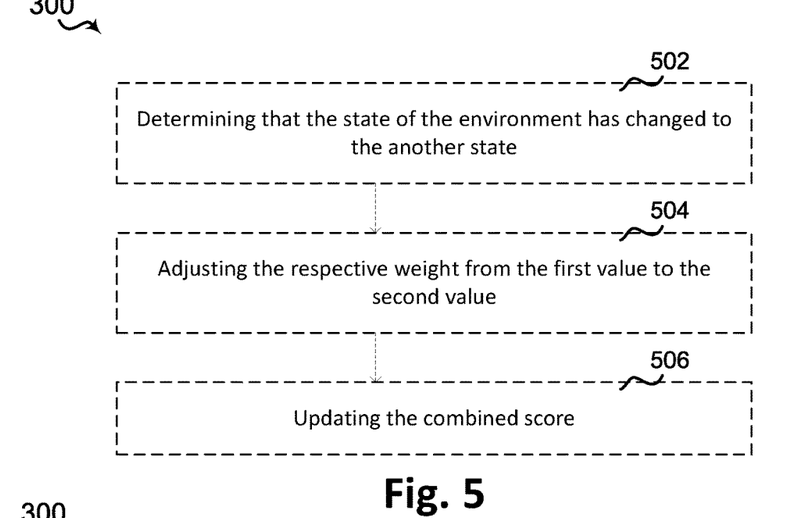
FIG. 5 is a flowchart illustrating a method of adjusting weights based on state, in accordance with exemplary aspects of the present disclosure.

FIG. 5 is a flowchart illustrating a method of adjusting weights based on state, in accordance with exemplary aspects of the present disclosure.

Referring to FIG. 5, in an optional or additional aspect, at block 502, the method 300 may further include determining that the state of the environment has changed to the another state. For example, in an aspect, computing device 200, processor 205, memory 210, event detection component 215, and/or determining component 260 may be configured to or may comprise means for determining that the state of the environment has changed to the another state. For example, the state of the environment may change from "train arrival" to "night shift" based on the event schedule and current time.

In this optional aspect, at block 504, the method 300 may further include adjusting the respective weight from the first value to the second value. For example, in an aspect, computing device 200, processor 205, memory 210, event detection component 215, and/or adjusting component 265 may be configured to or may comprise means for adjusting the respective weight from the first value to the second value.

For example, as seen in tables 2 and 3, the value of the weight for the characteristic "Visual of Person in Restricted Section" may decrease from 1.5 to 1.2.

In this optional aspect, at block 506, the method 300 may further include updating the combined score. For example, in an aspect, computing device 200, processor 205, memory 210, event detection component 215, and/or updating component 270 may be configured to or may comprise means for updating the combined score. For example, the combined score (including the changed confidence scores in table 3) may change from 330 to 301.

Figure 6:
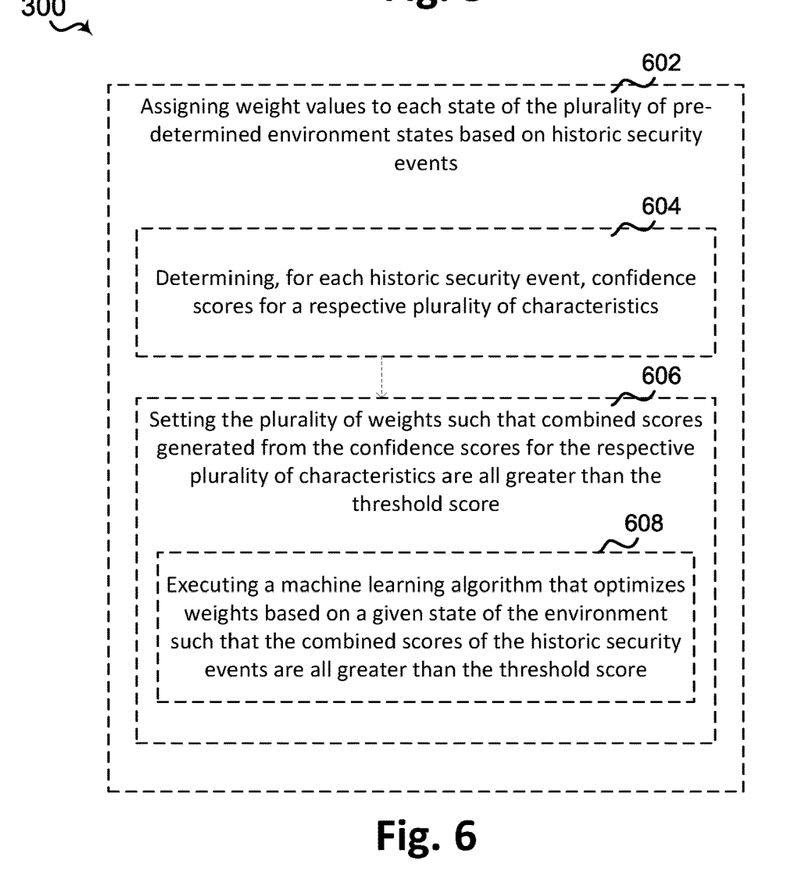
FIG. 6 is a flowchart illustrating a method of assigning weights to each state of a plurality of pre-determined environment states, in accordance with exemplary aspects of the present disclosure.

FIG. 6 is a flowchart illustrating a method of assigning weights to each state of a plurality of pre-determined environment states, in accordance with exemplary aspects of the present disclosure.

Referring to FIG. 6, in an optional or additional aspect, at block 602, the method 300 may further include assigning weight values to each state of the plurality of pre-determined environment states based on historic security events. For example, in an aspect, computing device 200, processor 205, memory 210, event detection component 215, and/or assigning component 275 may be configured to or may comprise means for assigning weight values to each state of the plurality of pre-determined environment states based on historic security events.

In this optional aspect, at block 604, the assigning at block 602 of weight values to each state of the plurality of pre-determined environment states based on the historic security events comprises determining, for each historic security event, confidence scores for a respective plurality of characteristics.

For example, consider that a trespassing security event has occurred in the past. The historic sensor data associated with that trespassing security event is retrieved and the plurality of detection algorithms are applied to determine the presence of characteristics and the associated confidence scores. Suppose that the confidence scores from the historic sensor data are: 85%, 80%, 60%, 10% and 10% (same as shown in table 1, for simplicity).

In this optional aspect, at block 606, the assigning at block 602 of weight values to each state of the plurality of pre-determined environment states based on the historic security events comprises setting the plurality of weights such that combined scores generated from the confidence scores for the respective plurality of characteristics are all greater than the threshold score.

For example, if the threshold score is 300, event detection component 315 sets the weights such that the combined score generated from the confidence scores of historic sensor data is at least 300. In this case, the respective weights may be 1.5, 1.025, 1.1, 1.2, and 1.25 as applying these weights yields a combined score of 300.

In this optional aspect, at block 608, the setting at block 606 of the plurality of weights comprises executing a machine learning algorithm that optimizes weights based on a given state of the environment such that the combined scores of the historic security events are all greater than the threshold score. For example, the machine learning algorithm may be a classification model that is trained using a dataset of known security events. The confidence scores for each characteristic may be part of the input vector alongside the classification of whether the event is a security event. The machine learning algorithm may learn a set of weights, that when applied to the input vector, gives an accurate classification of security event.

In an optional or additional aspect, each respective weight has a maximum value and a minimum value to prevent overfitting. For example, the respective weight associated with the characteristic "Visual of Person in Restricted Section" may have a minimum possible value of 1.0 and a maximum possible value of 2.0. Thus, any combination of weights determined in block 606 or 608 will ensure that the characteristic is not given too much or too little importance.

Figure 7:
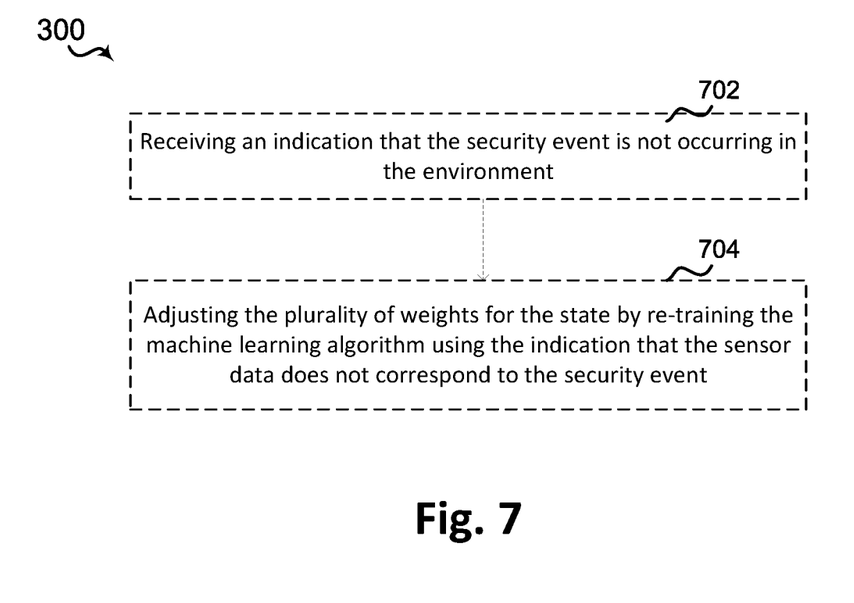
FIG. 7 is a flowchart illustrating a method of re-training a machine learning algorithm to adjust weights, in accordance with exemplary aspects of the present disclosure.

FIG. 7 is a flowchart illustrating a method of re-training a machine learning algorithm to adjust weights, in accordance with exemplary aspects of the present disclosure.

Referring to FIG. 7, in an optional or additional aspect, at block 702, the method 300 may further include receiving an indication that the security event is not occurring in the environment. For example, in an aspect, computing device 200, processor 205, memory 210, event detection component 215, and/or receiving component 280 may be configured to or may comprise means for receiving an indication that the security event is not occurring in the environment. For example, a security officer that receives the alert generated in block 312 may confirm that the security event occurred or did not occur by interacting with the graphical user interface of event detection component 215.

In this optional aspect, at block 704, the method 300 may further include adjusting the plurality of weights for the state by re-training the machine learning algorithm using the indication that the sensor data does not correspond to the security event. For example, in an aspect, computing device 200, processor 205, memory 210, event detection component 215, and/or adjusting component 285 may be configured to or may comprise means for adjusting the plurality of weights for the state by re-training the machine learning algorithm using the indication that the sensor data does not correspond to the security event.

For example, referring back to block 608, the machine learning algorithm may be re-trained by including the confidence scores and the indication that the sensor data does not correspond to the security event in a new input vector in the training dataset.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling a security system monitoring an environment, comprising:
   collecting sensor data from a plurality of sensors located in the environment;
   determining, based on the sensor data, whether a plurality of characteristics of a security event are present in the environment, wherein a determination for each respective characteristic further includes a respective confidence score indicative of a likelihood that the respective characteristic is present;
   identifying, from a plurality of pre-determined environment states, a state of the environment based on a current time and an event schedule of the environment;
   generating a combined score that is a function of each respective confidence score and a plurality of weights, wherein each weight of the plurality of weights corresponds to a respective characteristic of the plurality of characteristics and has a value based on the state of the environment, and wherein assigning weight values for each state of the plurality of pre-determined environment states comprises:
      analyzing historic sensor data of historic security events;
      determining, for a historic security event, confidence scores for a respective plurality of characteristics; and
      setting the plurality of weights such that combined scores generated from the plurality of weights and the confidence scores for the respective plurality of characteristics are all greater than a threshold score;
   determining that the combined score is greater than the threshold score; and
   generating an alert indicative of the security event in response to determining that the combined score is greater than the threshold score.

2. The method of claim 1, further comprising:
   identifying a remediation action associated with the security event in a data structure listing remediation actions for a plurality of security events; and
   executing the remediation action.

3. The method of claim 2, the threshold score is a first threshold score and wherein identifying the remediation action comprises:
   identifying a first remediation action that corresponds to the first threshold score and a second remediation action that corresponds to a second threshold score, wherein the second threshold score is greater than the first threshold score;
   selecting the first remediation action to execute in response to determining that the combined score is greater than the first threshold score and less than the second threshold score; and
   selecting the second remediation action to execute in response to determining that the combined score is equal to or greater than the second threshold score.

4. The method of claim 1, wherein a respective weight of the plurality of weights has a first value for the state of the environment and a second value for another state of the environment.

5. The method of claim 4, further comprising:
   determining that the state of the environment has changed to the another state;
   adjusting the respective weight from the first value to the second value; and
   updating the combined score.

6. The method of claim 1, wherein setting the plurality of weights comprises executing a machine learning algorithm that optimizes weights based on a given state of the environment such that the combined scores of the historic security events are all greater than the threshold score.

7. The method of claim 6, further comprising:
   receiving an indication that the security event is not occurring in the environment; and
   adjusting the plurality of weights for the state by re-training the machine learning algorithm using the indication that the sensor data does not correspond to the security event.

8. The method of claim 6, wherein each respective weight has a maximum value and a minimum value to prevent overfitting.

9. An apparatus for controlling a security system monitoring an environment, comprising:
  a memory; and
  a processor communicatively coupled with the memory and configured to:
    collect sensor data from a plurality of sensors located in the environment;
    determine, based on the sensor data, whether a plurality of characteristics of a security event are present in the environment, wherein a determination for each respective characteristic further includes a respective confidence score indicative of a likelihood that the respective characteristic is present;
    identify, from a plurality of pre-determined environment states, a state of the environment based on a current time and an event schedule of the environment;
  generate a combined score that is a function of each respective confidence score and a plurality of weights, wherein each weight of the plurality of weights corresponds to a respective characteristic of the plurality of characteristics and has a value based on the state of the environment, and wherein assigning weight values for each state of the plurality of pre-determined environment states comprises:
    analyzing historic sensor data of historic security events;
    determining, for a historic security event, confidence scores for a respective plurality of characteristics; and
      setting the plurality of weights such that combined scores generated from the plurality of weights and the confidence scores for the respective plurality of characteristics are all greater than a threshold score;
    determine that the combined score is greater than the threshold score; and
    generate an alert indicative of the security event in response to determine that the combined score is greater than the threshold score.

10. The apparatus of claim 9, wherein the processor is further configured to:
  identify a remediation action associated with the security event in a data structure listing remediation actions for a plurality of security events; and
  execute the remediation action.

11. The apparatus of claim 10, wherein the threshold score is a first threshold score, and wherein to identify the remediation action comprises to:
  identify a first remediation action that corresponds to the first threshold score and a second remediation action that corresponds to a second threshold score, wherein the second threshold score is greater than the first threshold score;
  select the first remediation action to execute in response to determine that the combined score is greater than the first threshold score and less than the second threshold score; and
  select the second remediation action to execute in response to determine that the combined score is equal to or greater than the second threshold score.

12. The apparatus of claim 9, wherein a respective weight of the plurality of weights has a first value for the state of the environment and a second value for another state of the environment.

13. The apparatus of claim 12, wherein the processor is further configured to:
  determine that the state of the environment has changed to the another state;
  adjust the respective weight from the first value to the second value; and
  update the combined score.

14. The apparatus of claim 9, wherein to set the plurality of weights comprises to execute a machine learning algorithm that optimizes weights based on a given state of the environment such that the combined scores of the historic security events are all greater than the threshold score.

15. The apparatus of claim 14, wherein the processor is further configured to:
  receive an indication that the security event is not occurring in the environment; and
  adjust the plurality of weights for the state by re-training the machine learning algorithm using the indication that the sensor data does not correspond to the security event.

16. The apparatus of claim 14, wherein each respective weight has a maximum value and a minimum value to prevent overfitting.

17. A non-transitory computer-readable medium storing instructions for controlling a security system monitoring an environment, wherein the instructions are executable by a processor to:
  collect sensor data from a plurality of sensors located in the environment;
  determine, based on the sensor data, whether a plurality of characteristics of a security event are present in the environment, wherein a determination for each respective characteristic further includes a respective confidence score indicative of a likelihood that the respective characteristic is present;
  identify, from a plurality of pre-determined environment states, a state of the environment based on a current time and an event schedule of the environment;
  generate a combined score that is a function of each respective confidence score and a plurality of weights, wherein each weight of the plurality of weights corresponds to a respective characteristic of the plurality of characteristics and has a value based on the state of the environment, and wherein assigning weight values for each state of the plurality of pre-determined environment states comprises:
    analyzing historic sensor data of historic security events;
    determining, for a historic security event, confidence scores for a respective plurality of characteristics; and
    setting the plurality of weights such that combined scores generated from the plurality of weights and the confidence scores for the respective plurality of characteristics are all greater than a threshold score;
  determine that the combined score is greater than the threshold score; and
  generate an alert indicative of the security event in response to determine that the combined score is greater than the threshold score.

* * * * *